(12) United States Patent
McKinnon et al.

(10) Patent No.: US 9,146,733 B1
(45) Date of Patent: *Sep. 29, 2015

(54) UPDATING INTEGRATION METADATA IN A SYSTEM

(71) Applicant: Okta, Inc., San Francisco, CA (US)

(72) Inventors: Todd McKinnon, San Francisco, CA (US); Matthew Mihic, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,525

(22) Filed: Oct. 3, 2014

Related U.S. Application Data

(63) Continuation of application No. 13/115,052, filed on May 24, 2011, now Pat. No. 8,881,129.

(51) Int. Cl.
G06F 9/44 (2006.01)
G06F 9/445 (2006.01)
G06F 11/36 (2006.01)

(52) U.S. Cl.
CPC .............. G06F 8/65 (2013.01); G06F 11/3688 (2013.01)

(58) Field of Classification Search
CPC ............... G06F 8/65; G06F 8/67; G06F 8/68; G06F 11/3688
See application file for complete search history.

(56) References Cited

U.S. PATENT DOCUMENTS 7,428,728 B2 * 9/2008 Tewksbary .................... 717/141
2010/0299664 A1 * 11/2010 Taylor et al. .................. 717/173

* cited by examiner

*Primary Examiner* — Anna Deng
(74) *Attorney, Agent, or Firm* — Fenwick & West LLP

(57) ABSTRACT

Updating integration metadata in a system includes determining at a services management platform that a service provider software code has changed in a manner that affects a canonical feature provided by the service management platform with respect to a service of the service provider to end users, wherein the canonical feature is provided at least in part by interacting with the service provider on the behalf of a user; and implementing at the services management platform, with respect to at least a subset of users, an accommodation that enables the canonical feature to be provided subsequent to the service provider software code having been changed.

20 Claims, 12 Drawing Sheets

|  | Payroll Service Provider | Sales/Marketing Service Provider | Code Repository Service Provider |
|---|---|---|---|
| Central point of user account creation (Canonical feature 1) | Not supported. | Supported; proprietary API. | Supported; proprietary API. |
| Federated single sign on (Canonical feature 2) | Supported; proprietary API. | Supported; SAML. | Supported; proprietary API. |
| One button user account deactivation (Canonical feature 3) | Not supported. | Supported; proprietary API. | Supported; proprietary API. |

FIG. 6

UPDATING INTEGRATION METADATA IN A SYSTEM

CROSS-REFERENCE TO RELATED APPLICATION

This application is a continuation of U.S. application Ser. No. 13/115,052, filed May 24, 2011, which is incorporated by reference herein in its entirety.

BACKGROUND OF THE INVENTION

An identity management or similar system may be used to integrate a client organization (or members of the client organization) with various end systems (e.g., service providers). Typically, a physical setup of the identity management system is installed at each client organization's site. For example, an installation of the identity management system for one client organization may include a set of connectors (e.g., for integrating with the end systems) relevant to that client organization and installed at that client's site and another installation of the identity management system can include another set of connectors for its client organization installed at its site. However, whenever one of the end systems is upgraded in a way that affects the operation of existing connectors, the identity management system may need to accordingly update its connector to that end system. Due to the separate physical installations of the identity management system at each client organization's site, as in the typical approach, a change at a service provider may require the identity management system vendor to also update each affected physical installation of the identity management system (e.g., by updating its connector to that service provider).

BRIEF DESCRIPTION OF THE DRAWINGS

Various embodiments of the invention are disclosed in the following detailed description and the accompanying drawings.

FIG. 6 is a table showing an embodiment of canonical features and integration support for a plurality of service provider.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Updating and sharing integration metadata in a multi-tenant system is disclosed. In various embodiments, an accommodation to a change at a service provider that affects a canonical feature provided via a central services management interface is developed. In some embodiments, the accommodation includes an update to an existing set of metadata or a new set of metadata to be used to cause the service provider to perform an action associated with the canonical feature. In some embodiments, a development community participates in developing the accommodation. In various embodiments, the accommodation is implemented at the central interface, for example to accommodate changes to an interface associated with the service provider. In some embodiments, implementing the accommodation includes notifying affected members of a multi-tenant system that the accommodation is available.

Figure 1:
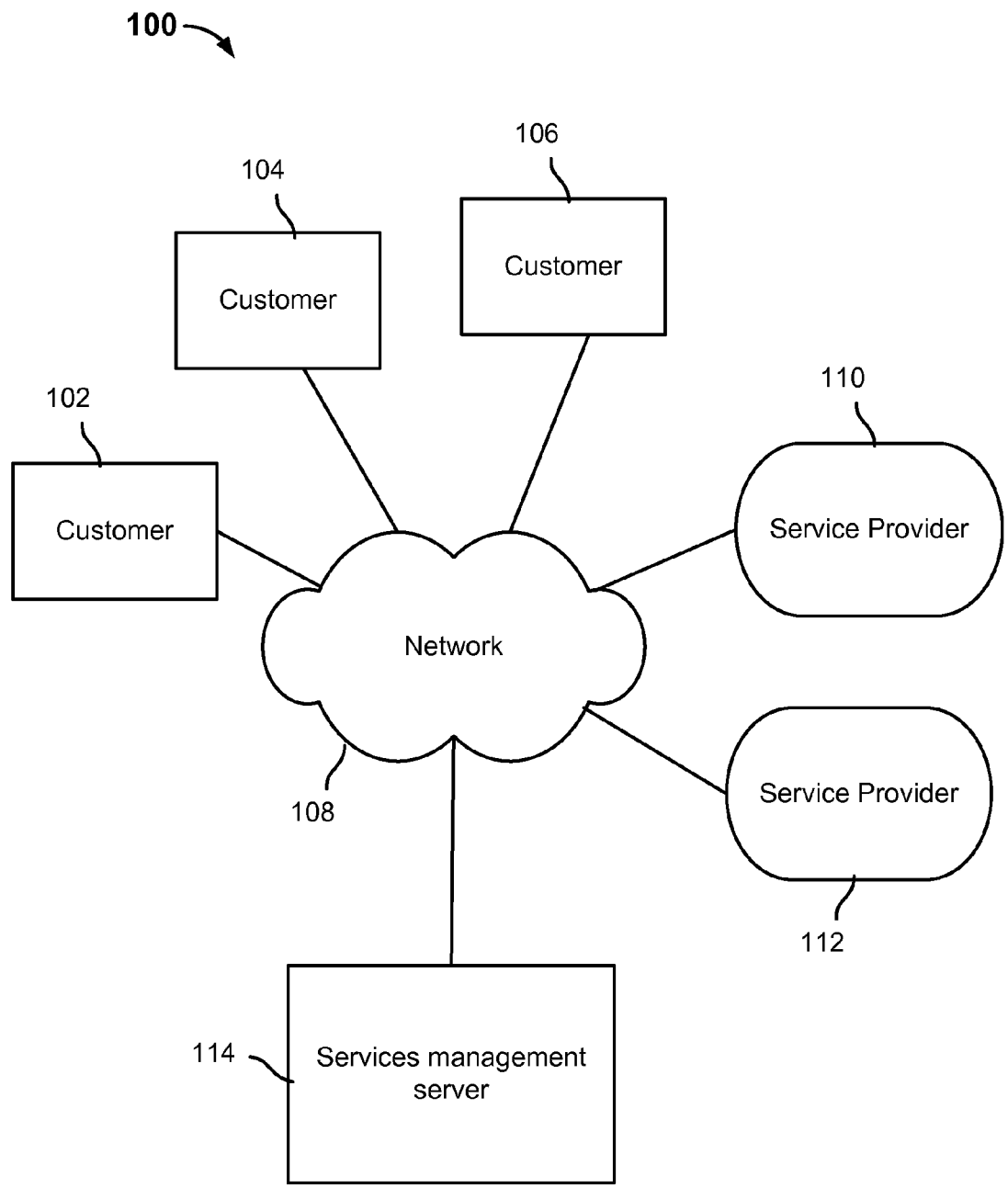
FIG. 1 is a diagram showing an embodiment of a system for updating and sharing metadata in a multi-tenant system.

FIG. 1 is a diagram showing an embodiment of a system for updating and sharing metadata in a multi-tenant system. As used herein, a multi-tenant system refers to an architecture in which each of a plurality of clients and/or client organizations (i.e., tenants) access one or more services via a central services management or other system. In various embodiments, each tenant may access a set or subset comprising one or more of a plurality of available services. In the example shown in FIG. 1, system 100 includes a plurality of customers represented by customers 102, 104, and 106. Each customer accesses one or more services via a network 108, for example from service providers such as service providers 110 and 112. Services management server 114 in various embodiments provides to customers 102, 104, and 106, in a canonical manner, access with respect to one or more service providers to one or more canonical features. Examples of a canonical features in such an environment include, without limitation, single sign on (SSO), user creation and deletion, account establishment, account deletion, account payment, etc.

To perform configured canonical features, end users associated with customers 102, 104, and 106 access the canonical feature with respect to a service by invoking the canonical feature at and/or through the services management server 114. The services management server 114 in turn interacts with the service provider, in a manner associated with that particular service provider (e.g., proprietary, standards based, etc.) to cause the service provider to perform one or more operations and/or other actions associated with the canonical feature.

Examples of service providers 110 and 112 include, but are not limited to, software and/or related functionality provided to end users as a remotely or other hosted service, e.g., so-called "software as a service" or SAAS. One example of a service provider is sales/marketing service provider Salesforce.com, which provides services related to sales and collaboration tracking. In the example shown, service providers 110 and 112 provide services to one or more of customers 102-106. Although only three customers 102, 104 and 106 are shown in the example of FIG. 1, services management server 114 can support more or fewer customers (e.g., tenants). In some embodiments, customers 102-106 are organizations such as companies. In the example shown, customers 102-106 are "customers" with respect to services management server 114 for receiving service management from the server (but customers 102-106 can also be considered as customers with respect to the service providers for subscribing to their respective services). Network 108 includes various high speed data networks and/or telecommunications networks.

Services management server 114 is configured in various embodiments to communicate with service providers 110 and 112 to provide one or more canonical features to customers 102-106 (or members thereof). In various embodiments, customers or members thereof are referred to as end users. Although only two service providers are shown in the example of FIG. 1, service management server 114 can communicate with more or fewer service providers. (In some embodiments, services management server 114 is a service provider because in addition to managing access to service providers 110 and 112, services management server 114 provides its own set of services to customers 102-106.) A canonical feature may include an operation or action for which a uniform or consistent interaction or experience is attempted to be provided to an end user across multiple service providers. In some embodiments, a services management server or other mediating node is configured to interact with service providers to make one or more canonical features available to end users across services, including by interacting with service providers in a manner required to cause the service provider to perform actions necessary to provide such canonical features, for example as/when invoked by end users. This uniform or consistent experience by the user is (where possible) independent of the underlying set of services provided by a particular service provider and/or the manner or sequence with which interactions with a particular service provider are performed.

For example, if customer 102 uses services provided by both service provider 110 and service provider 112, an administrative user associated with customer 102 may in some embodiments interact with services management server 114 to create a new end user (e.g., an employee) associated with customer 102 (e.g., a business or other enterprise), for example by invoking a new user creation interface of services management server 114. Services management server 114 in turn interacts with service provider 110 and service provider 112 as required to create with respect to each, as/if required, a service provider-specific user account for that end user. In the future, the end user gains access to the respective services as required by logging in to the services management server 114, which in turn logs the end user in as/if required with those services the end user has indicated, e.g., via a service launch interface, that the end user desire to use.

In some embodiments, a canonical feature relates to or is associated with a user account. Some examples include changing user account permissions or settings, changing a group comprising of one or more user accounts, viewing activity for a user account, etc. In some embodiments, a canonical feature is related to security or authorization. For example, a company may want to have employees set passwords that include a capital letter, a number, and a special character; this policy is enforced as part of a canonical feature independent of any individual requirements service providers 110 and 112 might have in some embodiments. In some embodiments, a canonical feature is defined by or is in the context of a particular company. Put another way, canonical features for one company may differ from that of another company (e.g., using services of the same service provider) in some embodiments.

In some embodiments services management server 114 stores or has access to customers profiles that describe for each customer of system 100 the services with respect to which management server 114 is configured to provide one or more canonical features (for example, single sign on access) to end users associated with that customer. For example, in system 100, customers 102 and 104 may be configured to receive services from service providers 110 and 112, but customer 106 may only receive services from service provider 110. In some embodiments, services management server 114 may be configured to provide to different individual end users of a customer different levels of access to a service.

In some embodiments, communication between services management server 114 and service providers 110 and 112 includes performing any prerequisites, translation, mediation, and/or proxying associated with service providers 110 and 112 as needed. Without services management server 114, customers 102-106 may have to access each service provider directly (e.g., the website of each service provider) and may not have a central interface or point of access from which all services can be accessed.

Services management server 114 is configured in various embodiments to communicate to service providers 110 and 112 on behalf of customers 102-106 to perform one or more canonical features by using metadata. In some embodiments, the metadata is used to integrate data submitted or selections made by customers 102-106 at services management server 114 with services offered by service providers 110 and 112. Metadata may include information or data describing or associated with a service provider. The metadata may include information associated with canonical feature (e.g., whether a canonical feature is supported by a service provider) and/or may include information associated with an action (e.g., an underlying action used by a particular service provider to support a particular canonical feature). In some embodiments, metadata that is used by and/or for the benefit of one or more of customers 102-106 is stored at services management server 114 or at another centralized location to which services management server 114 can access.

For example, if an end user associated with customer 102 indicates a desire to access a service associated with service provider 110, in some embodiments to provide to the end user access to the service, e.g., directly from service provider 110, a sign in engine of the services management server 114 may use a metadata associated with the service (and/or service provider 110) as implemented by and/or with respect to the end user, for example a metadata associated with a version of service provider 110's client software known to be installed at the end user's client computer system, to determine at least in part how the sign in engine must interact with service provider 110 to sign the end user in to the service.

In various embodiments, sometimes a change occurs at a service provider that results in the current metadata no longer being effective to provide integration with the service provider as desired. For example, errors are produced when an action associated with a canonical feature is requested. In the example above, for example, an attempt to sign an end user in using metadata that worked in the past may result in an error or other failure. In various embodiments, in response to detecting such a change, services management server 114 is configured to receive, obtain, and/or generate updates to existing metadata and/or new metadata that enables services management server 114 to resume smooth integration with the service provider once again. For example, in some embodiments the services management server 114 is configured to determine (and/or receive an indication) that client software of a service provider has been upgraded at a customer site and/or that software used by the service provider to provide the service has been updated in a manner that has resulted in errors or other failures being encountered when attempting to provide a canonical feature using metadata that worked for the previous version of the service provider's client and/or server side software.

Determining with respect to one or more tenants in a multi-tenant system that a metadata or other data and/or code required to provide access with respect to a service provider's service to a canonical feature is no longer (fully) operable to provide the canonical feature; generating and/or otherwise receiving an updated and/or new metadata or other data and/or code operable to provide access to the canonical feature despite a change that caused integration to be lost; and propagating to one or more other affected tenants the updated and/or new metadata or other data and/or code required to provide access to the canonical feature with respect to the service is disclosed. In some embodiments, characteristics of the multi-tenant environment are leveraged to generate and/or propagate the updated and/or new metadata or other data and/or code.

Figure 2:
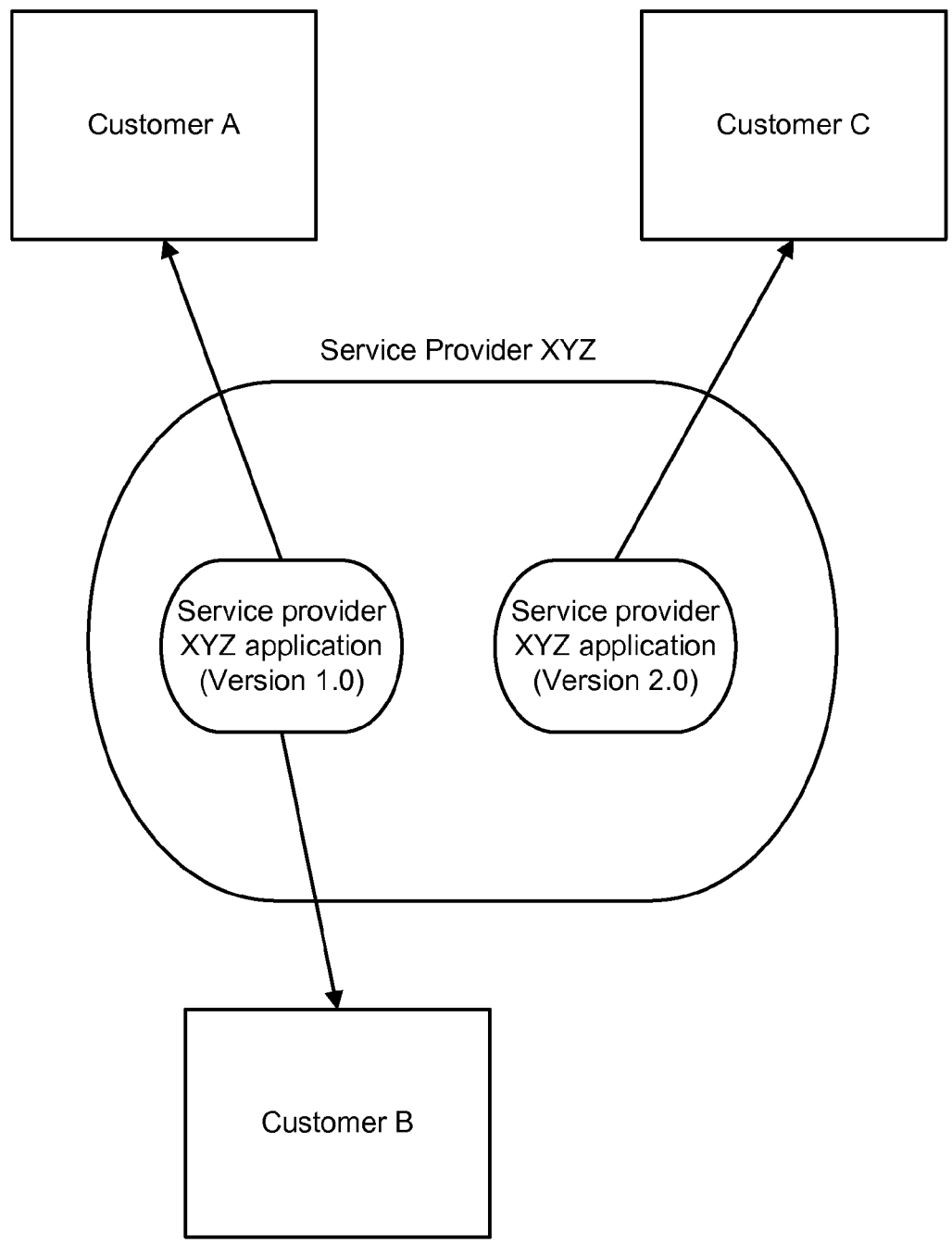
FIG. 2 is a diagram showing an example of services provided by a service provider to multiple customers.

FIG. 2 is a diagram showing an example of services provided by a service provider to multiple customers. In various embodiments, a service provider provides its services as an application (e.g., consisting of one or both of software and hardware and is configured to render actions associated with canonical features). A service provider may support different versions of an application or other code used to provide a service. For example, a subsequent version (e.g., a version 2.0 is subsequent to version 1.0) may include improvements or upgrades (e.g., fixed bugs, additional functionalities, faster service) or other differences from a previous version of the application; but not all users of the service may have upgraded to the subsequent version and there are therefore multiple versions used by customers, at least for a time. In some embodiments, a service provider maintains multiple versions of an application (as shown in the example) and different customers can use different versions (e.g., depending on the customer's subscription or needs). In the example shown, two versions of server side software are shown; however, a service provider may also and/or instead make available one or more versions of client side software used by customers and/or end users associated therewith to access a service of the service provider. A service provider may maintain more than one version of an application or other server and/or client side code for a period of time before eliminating one or more (usually, older) version(s) such that only one version is supported. For example, a service provider may introduce a new version of an application to its customers and continue to support an older version for a certain time as a way of phasing the older version out.

In various embodiments, a services management server, such as services management server 114 of FIG. 1, keeps track of which customers are using which version of a service provider's software (e.g., in each customer's profile). In some embodiments, metadata that is used to integrate customers with a service provider may no longer work as desired (e.g., errors are generated) when a service provider upgrades its client and/or server side code to a new version. In some embodiments, a new version may implement a change at the service provider that is detectable by the services management server and/or warrants an update to the metadata used by the services management server. For example, a new data field may be defined, one previously defined may no longer exist or may have been renamed, a new interface and/or interface method may have been defined, etc. As disclosed herein, a multi-tenant services management platform is configured to detect such changes, obtain updated and/or new metadata (or other connectors) required to restore integration, and propagate the updated and/or new metadata (or other connectors) to other tenants of the multi-tenant system.

In the example shown in FIG. 2, service provider XYZ has two applications, version 1.0 and version 2.0. In this example, version 2.0 is newer than version 1.0 and contains a slight change in interface (e.g., a new data attribute is required to perform an action associated with a canonical feature). Customers A and B are currently subscribed to version 1.0 because version 2.0 did not yet exist when they became clients of service provider XYZ. Customer C is subscribed to version 2.0 because C became a client of the service provider after version 2.0 was available and was automatically directed to that version and/or was the first of the three to upgrade to the new version. A services management server that communicates with service provider XYZ on behalf of customers A, B, and C maintains and/or accesses metadata that integrates with both versions 1.0 and 2.0 of the application. For example, the services management server may use a single set of metadata to interact with both versions 1.0 and 2.0 of the application, as may be sufficient if for example both versions are the same in respects relevant to a canonical feature the metadata is used to provide, such as sign in, or the services management server may instead maintain one set of metadata for version 1.0 and a second set of metadata for version 2.0. In some embodiments, a services management server has an awareness of which version of a service provider's application it should interact with for which customer based on customer profiles. For example, in the example shown in FIG. 2, the services management server may be configured to determine that an end user is associated with customer C, then use customer C's profile to determine the applicable version of the service provider software that customer C is associated with (here version 2.0), then use that information to use the corresponding second set of metadata to provide the canonical feature.

Referring further to FIG. 2, assume that later a version 3.0 of the application is created. Also, assume that the existing metadata (e.g., that smoothly integrated with versions 1.0 and 2.0) no longer work as desired with version 3.0. As such, a new version of the metadata (e.g., a new set of metadata) may be created for use by the services management server to integrate with version 3.0. This way, for a customer is using version 3.0 of the service provider application (e.g., because its service was automatically upgraded to version 3.0 when the version became available), the services management provider can use the newly available set of metadata to integrate with the new version of the application on behalf of the customer without the customer needing to wait for a vendor to update a physical installation of a central system at the customer's site.

Figure 3:
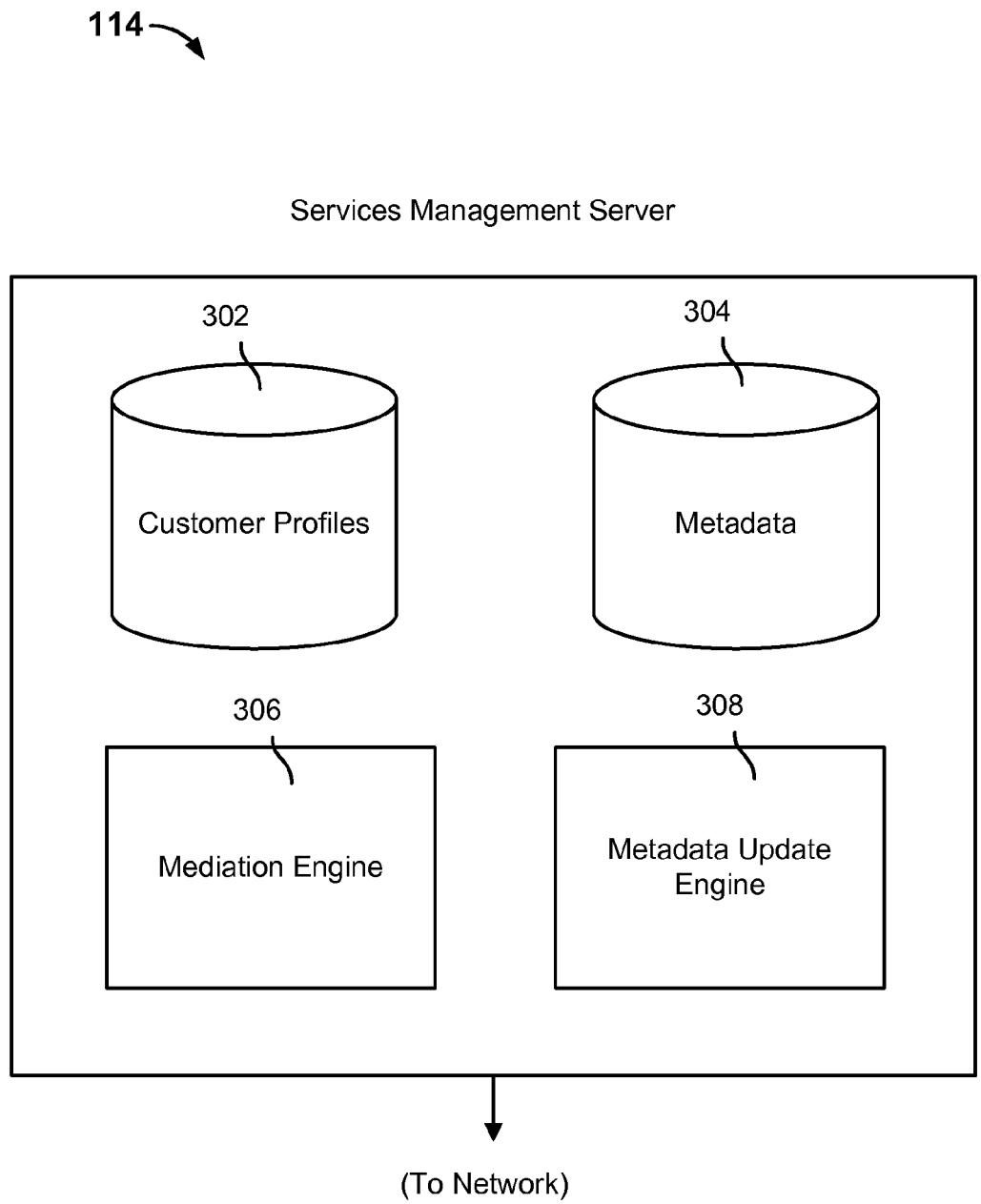
FIG. 3 is a diagram showing an embodiment of services management server.

FIG. 3 is a diagram showing an embodiment of services management server. In some embodiments, the example of FIG. 3 is used to implement services management server 114. In the example shown, services management server 114 includes customer profiles 302, metadata 304, mediation engine 306, and integration update engine 308.

In various embodiments, customer profiles 302 include for each customer supported by services management server 114 information indicating which services the customer uses from which supported service providers and for each (as applicable) the version of the service provider's software that customer currently uses.

In various embodiments, the services management server stores in metadata 304 information describing how canonical features are accessed from and/or provided by one or more service providers. For example, with respect to sign in the metadata may indicate for a service provided by a particular service provider to a customer using a specified version or set of versions of the service provider's software such information as what type of sign in protocol is used (e.g., custom, an identified one of a plurality of supported standards, etc.) and/or a mapping of end user credential values (e.g., user name and/or password) as stored on and provided by end users to the service management platform (e.g., in connection with single sign on) to corresponding fields and/or other attributes or variables as named and understood by the service provider. The components (e.g., customer profiles 302, metadata 304, mediation engine 306 and integration update engine 308) can be implemented using software and/or hardware and can be implemented as one or more devices.

In various embodiments, metadata 304 includes metadata to be used with one or more service providers. In some embodiments, metadata 304 includes a database. In some embodiments, a different database is used to store the metadata to be used with each service provider. In some embodiments, the metadata used by services management is stored separately from the server but can be accessed by the server. Metadata includes any information or data describing or associated with a service provider. The metadata may include information associated with a canonical feature (e.g., whether a canonical feature is supported by a service provider) and/or may include information associated with an action (e.g., an underlying action used by a particular service provider to support a particular canonical service). In some embodiments, metadata includes software code, code snippets, executable instructions, processes, or other functionality for communicating with or interacting with a service provider to perform one or more tasks in order to accomplish a desired canonical service. In some embodiments, metadata indicates or describes what function or process to execute or call. In some embodiments, metadata includes what settings or values to provide or populate a function or process with. In various embodiments, metadata includes attribute bindings, mappings of data fields (e.g., between those of a user interface of services management server 114 and those of an interface at a service provider), code (e.g., methods, processes, functions . . . etc.) that instruct how attributes are to be used to interact with a service provider and/or a third party entity (e.g., authentication server).

Mediation engine 306 is configured to use the appropriate metadata associated with a service provider to interact with a service provider in order to perform a requested action. For example, referring to FIG. 2, if customer A requests an action associated with service provider XYZ, then mediation engine 306 accesses the metadata in metadata 304 associated with service provider XYZ and interacts via a network with service provider XYZ in a manner determined at least in part by the accessed metadata. For example, in the case of sign in, the metadata may indicate a URL of a service provider service sign in site, a sign in protocol the service provider uses, and/or variable names used by the service provider to transport and/or store credentials such as a user name and/or password.

In some embodiments, mediation engine 306 includes one or more translators, or mediators, functions, executables, or processes for communicating with a service provider in order to support a canonical service. In some embodiments, metadata of metadata 304 indicates which such process (located in mediation engine 306) to use and mediation engine 306 performs or runs the indicated process. In some embodiments, formats, variables, fields, settings, or values (e.g., input or passed to an executed process) are obtained from metadata and passed to the appropriate process within mediation engine 306. In some embodiments, the metadata indicates how data submitted (e.g., by a customer) at a central interface of services management server is to be passed or mapped to which attributes at an interface associated with a service provider. In some embodiments, the metadata includes computer code. For example, the code can instruct on how submitted data is to be passed or processed with respect to a function at the interface of the service provider. Also for example, the code can instruct on how a propriety API of a service provider is to be interacted with to achieve a certain result (e.g., creation of a user account at the service provider). In some embodiments, metadata includes XMLs files.

Metadata update engine 308 is configured in various embodiments to detect a change at a service provider and/or to obtain, receive, and/or generate updates to the metadata of metadata 304 to accommodate to the change. For example, metadata update engine 308 may be configured to detect a change by noting errors, if any, that arise from using existing metadata to interact with a service provider. In some embodiments, metadata update engine 308 is and/or may be configured to notify a development community of the need to update the metadata to accommodate to the detected change. The development community may include customers, administrators of the services management server, among other interested developers. In some embodiments, metadata update engine 308 is configured to receive updates to existing metadata or additions of new metadata and to store the updates at metadata 304. In some embodiments, metadata update engine 308 is configured to present the updated metadata and/or the metadata that has not been updated in a display to customers and/or other interested developers. For example, the display in various embodiments includes one or more of information describing when each set of metadata was created, by whom, to be used with which service provider, to be used with which version of an application associated with a service provider, and associated ratings or reviews. In some embodiments, metadata update engine 308 is configured to receive a selection (e.g., by a customer) of a displayed set of metadata and to associate the selector with the selected metadata such that the next time the customer requests an action associated with the service provider, the selected set of metadata will be used to interact with the service provider. In some embodiments, metadata update engine 308 is configured to automatically associate a set of (updated) metadata to a service provider (e.g., of which the metadata was updated to accommodate a change) the next time one or more customers requests an action to be performed at the service provider.

A multi-tenant system with a services management server such as the one described benefits from the fact that integration to one or more service providers can be centrally supported for any number of customers. For example, integration metadata need only be updated centrally for the entire multi-tenant system (at the one or more locations where metadata for the system is maintained) in order for it to be propagated to all affected tenants of the system. As customers upgrade to a newer version of a service provider's software, for example, and/or become comfortable with a new/updated metadata made available to respond to an upgrade or other change to the service provider's software, such customers are associated, through customer profiles for example, with the new/updated metadata, which from then on is used centrally to provide one or more canonical features to that customer with respect to the affected service provider. This provides the flexibility for dynamic and more frequent and/or rapid updating of systems or applications associated with the service providers and for the tenants of the system to receive notice of the option to also update.

In some embodiments, the services management server may be configured to automatically migrate customers to newer versions of a service provider's software once an updated metadata is available and/or to manually and/or automatically delay such an upgrade unless/until updated metadata is available at the services management server, e.g., to ensure access to canonical features can be provided without interruption.

Figure 4:
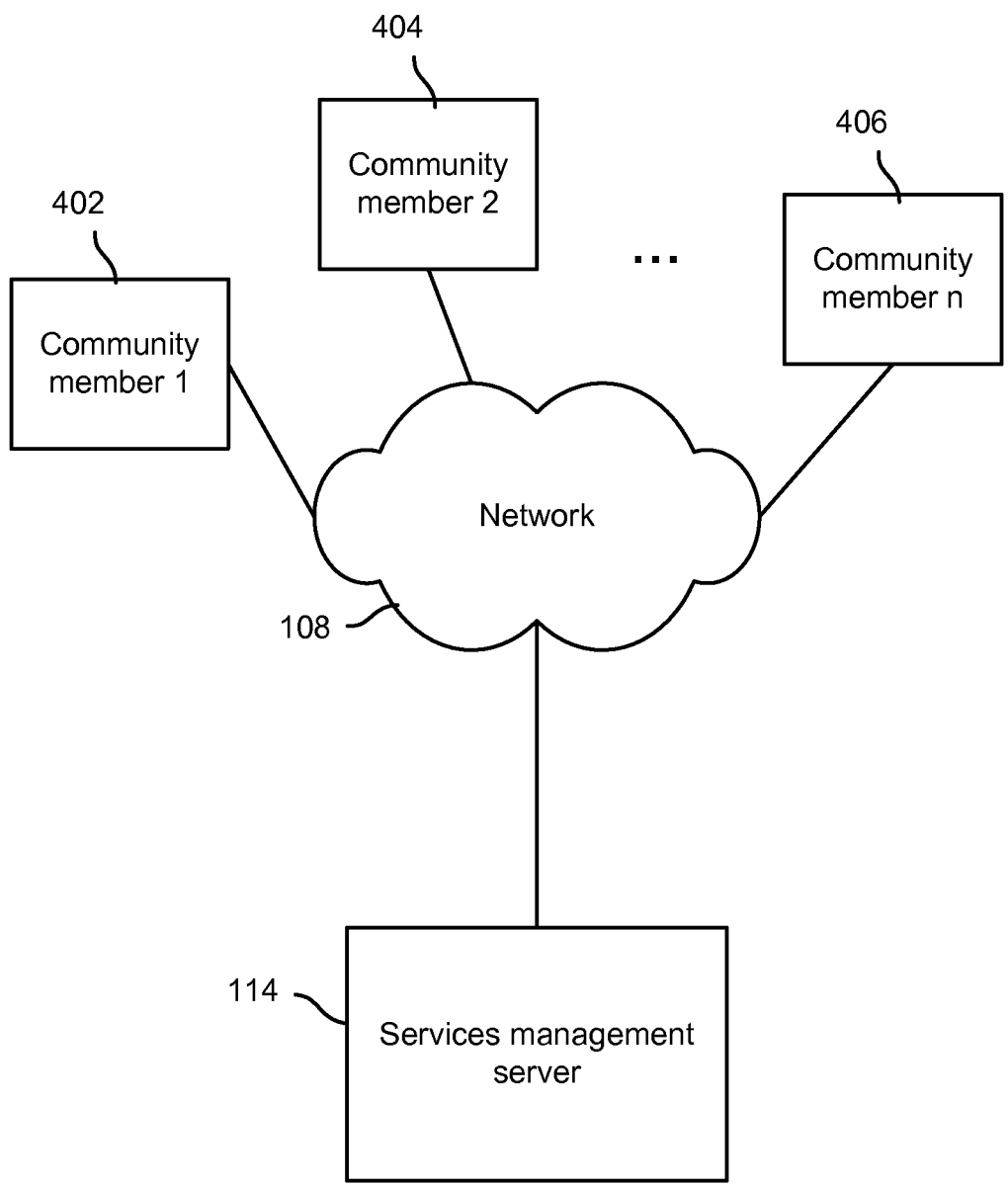
FIG. 4 is a diagram showing an embodiment of a services management server that communicates with a development community.

FIG. 4 is a diagram showing an embodiment of a services management server that communicates with a development community. In the example shown, services management server 114 communicates to a community of developers via network 108. Services management server 114 receives an indication, for example from one or more members of the community that a change has occurred with respect to a service provider. For example, services management server 114 may receive an indication from one or more members of the community that the current metadata is not working as intended (e.g., using the current metadata to access the service providers is generating errors) and/or needs to be updated. Services management server 114 communicates to a community to notify of a change at a service provider (e.g., a version upgrade) and/or a need to update the metadata to accommodate the change. Updated metadata (e.g., created by one or members of the community) is received and a selection of available metadata updates and/or with corresponding descriptions of each set of metadata (e.g., when it was created, who it was created by, which version of an application it is designed for) is sent to interested members of the community, for example those that use an affected version of a service provider's software. In some embodiments, services management server 114 communicates to a community to receive feedback (e.g., ratings, reviews) on available metadata and shares such information with the community.

A developer of the community in various embodiments may include one or more of any entity, organization, or individual with an interest in creating or using metadata associated with accessing services at service providers through the services management server. Examples of a community member include a customer (or member thereof) of services management server, an administrator or other individual associated with services management server, a third party, a service provider or an individual associated with the service provider. An advantage of the community is its open nature in permitting interested parties to participate in submitting accommodations (e.g., in the form of updated or new metadata) in response to common problems (e.g., changes at the service providers that render current metadata inadequate for its intended purpose). Another advantage of the community is its ability to facilitate sharing of improvements (e.g., updated metadata), which are sometimes created by the tenants of the system, with all tenants of the multi-tenant system.

Figure 5:
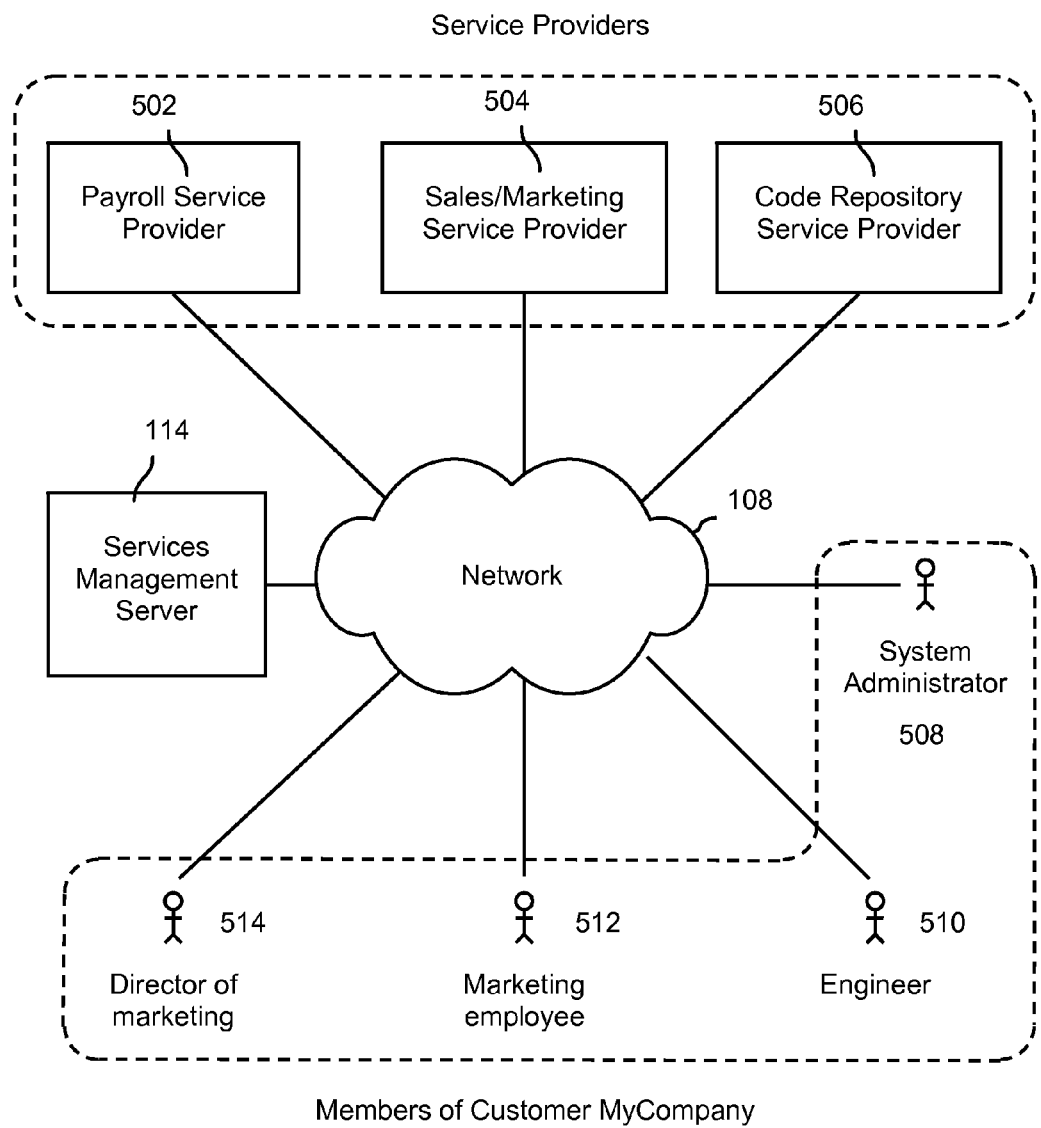
FIG. 5 is a diagram showing an example of a plurality of service providers which provides services to members of a company.

FIG. 5 is a diagram showing an example of a plurality of service providers which provides services to members of a company. In some embodiments, the example of FIG. 5 is implemented with system 100. In the example shown, employees 508-514 are members of customer MyCompany. In the example shown, MyCompany is a customer of services management server 114 and subscribes to services from payroll service provider 502, sales/marketing service provider 504, and code repository service provider 506.

Payroll service provider 502 provides one or more services related to payroll management and all employees of MyCompany have at least some access to its services. Some examples of payroll service providers include ADP and Intuit and some examples of payroll related services including changing a number of (tax) deductions, changing a routing number and account number for automatic deposit, etc. Sales/marketing service provider 504 provides one or more services to support sales and/or marketing professionals. Some examples of a sales/marketing service provider include Constant Contact (which provides email marketing services) and salesforce.com (which provides services related to sales and collaborations tracking) Code repository service provider 506 provides one or more services related to code management. For example, a software product may comprise a plurality of modules or functions developed by a team of engineers and code repository service provider 506 provides one or more services associated with (for example) checking out a module/function, checking in a new version of a module/function, tracking versions of code or when features are added (e.g., in a comments section), tracking the detection and resolution of bugs, etc. Some examples of code repository service providers include Bugzilla and Codesion.

Services management server 114 communicates with service providers 502-506 (on behalf of one or more of members 508-514 of customer MyCompany, for each with respect to that member's list of available services and access level with respect to each) to provide one or more canonical features to members 508-514 of customer MyCompany. In some embodiments, a service management server or other mediating node is configured to interact with services providers to make one or more canonical features available to end users across services, including by interacting with service providers in a manner required to cause the service provider to perform actions necessary to provide such canonical features, for example as/when invoked by end users.

FIG. 6 is a table showing an embodiment of canonical features and integration support for a plurality of service provider. In this example, service providers 502-506 from FIG. 5 and three example canonical features are shown. In some embodiments, metadata includes at least some of the information shown in table 600. In some embodiments, a set of metadata includes the information for (e.g., how to interact with) each service provider for one or more canonical features that the service provider supports.

The first example canonical feature shown in FIG. 6 is a central point of user account creation. This canonical feature enables a system administrator to create—from a single or central interface—new user accounts for those services that are appropriate for that particular employee (e.g., when a new employee is hired or an employee's needs have changed). In contrast, other systems may require a system administrator to go to each service provider's website and re-enter the same user information over and over at each service provider. In this example, payroll service provider (502 in FIG. 5) does not support this canonical feature but sales/marketing service provider (504 in FIG. 5) and code repository service provider (506 in FIG. 5) do using proprietary application programming interfaces (APIs), respectively. For example, the code repository service provider may have implemented its own API and although other devices or entities are able to interface to it, it is relatively unique API. As used herein, an unsupported canonical feature means that that service provider does not expose or provide any interface or functionality with which a services management server can interface or communicate with for that canonical feature. In some embodiments, a service provider which expects (human) users to go directly to a service provider's website and (manually) enter information for a canonical feature is one that does not support that canonical feature.

The second canonical feature shown in this example is single portal access to services. This allows a user (e.g., either a system administrator or a non-system administrator) to view and access all the services for which they have user accounts or access from a single portal or interface, for example after signing on only once. This is convenient for the user since she does not need to remember a different URL or portal for each service and local usernames and passwords. The user can also quickly and easily see what services she has access to. In table 600, the payroll service provider supports this canonical feature using a proprietary API; the sales/marketing service provider supports this canonical feature using SAML (Security Assertion Markup Language) and the code repository service provider supports it with a propriety API. In some embodiments, the API associated with the payroll service provider and the API associated with the code repository service provider are different proprietary APIs.

The third example canonical feature is one button user account deactivation. For example, when an employee leaves a company, a system administrator is able to deactivate all user accounts (for all services for which that employee has an account) from a single point, using a single interaction. As used herein, deactivation disables a user's ability to access an account service or services thereof. In some embodiments, deactivation is performed by deleting a user account. In some other embodiments, the user account or user information still exists but the user is no longer able to access services. One button user account deactivation is more convenient than (for example) figuring out which services an employee has an account with, going to each of those service providers (e.g., their website), and deactivating or deleting the account locally and/or individually at each service provider. The sales/marketing service provider supports this canonical feature with a proprietary API, the code repository service provider supports this with a propriety API, and the payroll service provider does not support this canonical feature.

For example, a set of metadata associated with sales/marketing service provider includes instructions on how to interact with the service provider to perform actions associated with the three canonical features (e.g., central point of user account creation, federated single sign on, and one button user account deactivation) that it supports. For example, for the central point of user account creation, the set of metadata may include code instructing to invoke various calls, functions or process with the proprietary API (and/or mappings of data attributes required by invocations).

Figure 7:
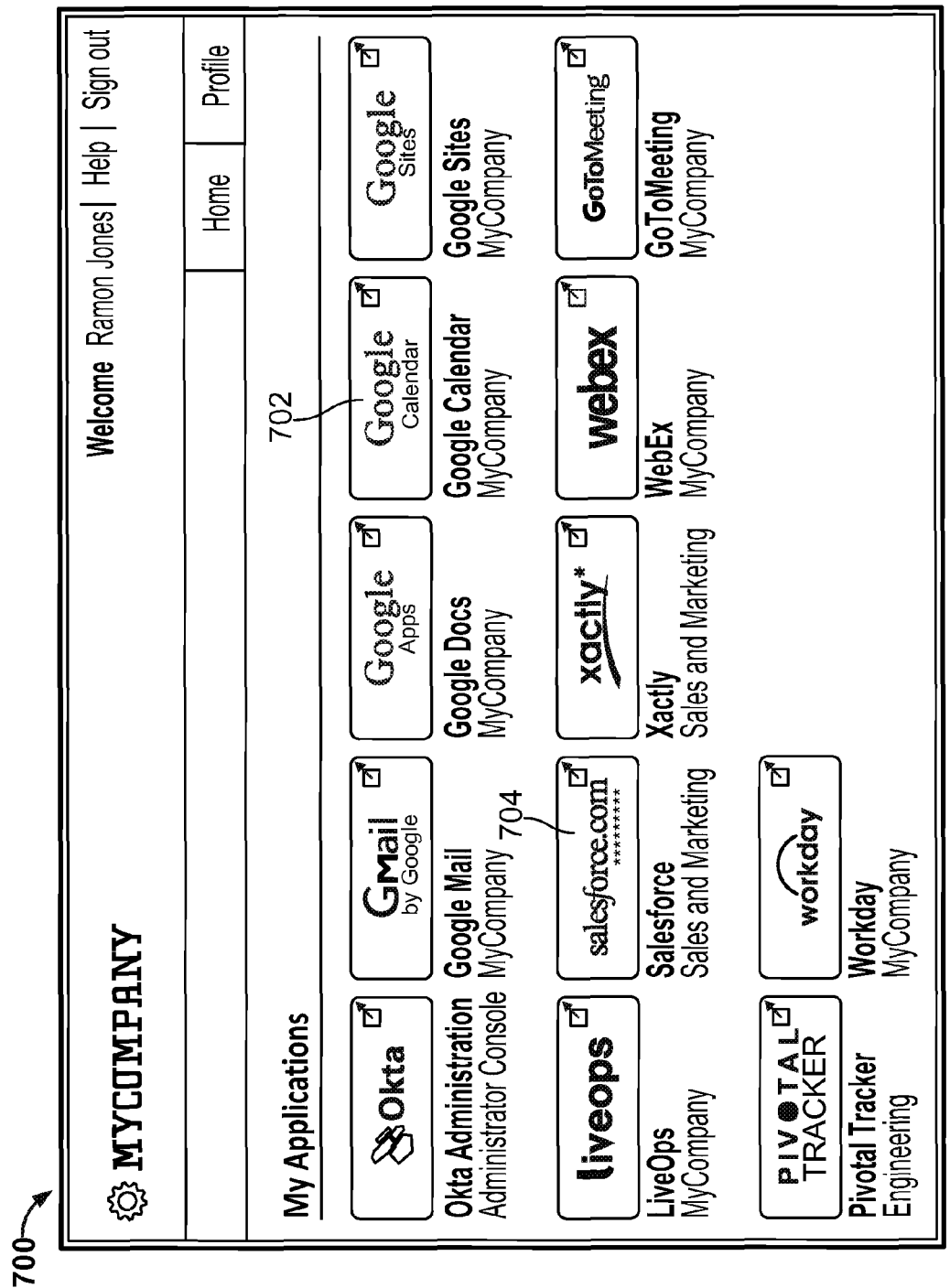
FIG. 7 is a diagram showing an embodiment of a user interface associated with a single portal via which services are accessed.

FIG. 7 is a diagram showing an embodiment of a user interface associated with a single portal via which services are accessed. This example shows one embodiment of the second exemplary canonical feature shown in FIG. 6. In this example, a user (Ramon Jones) is presented with the services to which he has access. From interface 700, Ramon can select a service (e.g., Google Calendar 702) and access functions or actions provided by that service provider (e.g., view appointments and create new appointments). In some embodiments, Ramon enters his username and password once (e.g., prior to being presenting interface 700) and subsequent entry of a user name or password (e.g., in order to access a particular service or service provider) is not required. For example, Ramon would not need to enter his Google user name and Google password in order to access Google Calendar 702.

In some embodiments, in order to get to interface 700, a user goes to a website or portal associated with a services management service (e.g., www.okta.com). In some embodiments, a user goes to a website or portal associated with or accessible from a company's website or intranet (e.g., www-.mycompany.com) in order to access interface 700.

In some embodiments, the services for which a user (e.g., Ramon Jones) has access to may be dictated by that employee's job functionality or job requirements. For example, beneath Salesforce icon 704 is displayed "Sales and Marketing." In some embodiments, all sales and marketing professionals have access to at least some Salesforce services. In some cases, a service is made available to all employees. For example, Google Calendar 702 may be made available to all employees. In some embodiments, prior to generating and presenting interface 700, a services management server accesses stored information associated with Ramon Jones, determines what services Ramon has access to, and presents icons associated with those services to Ramon in interface 700.

Figure 8:
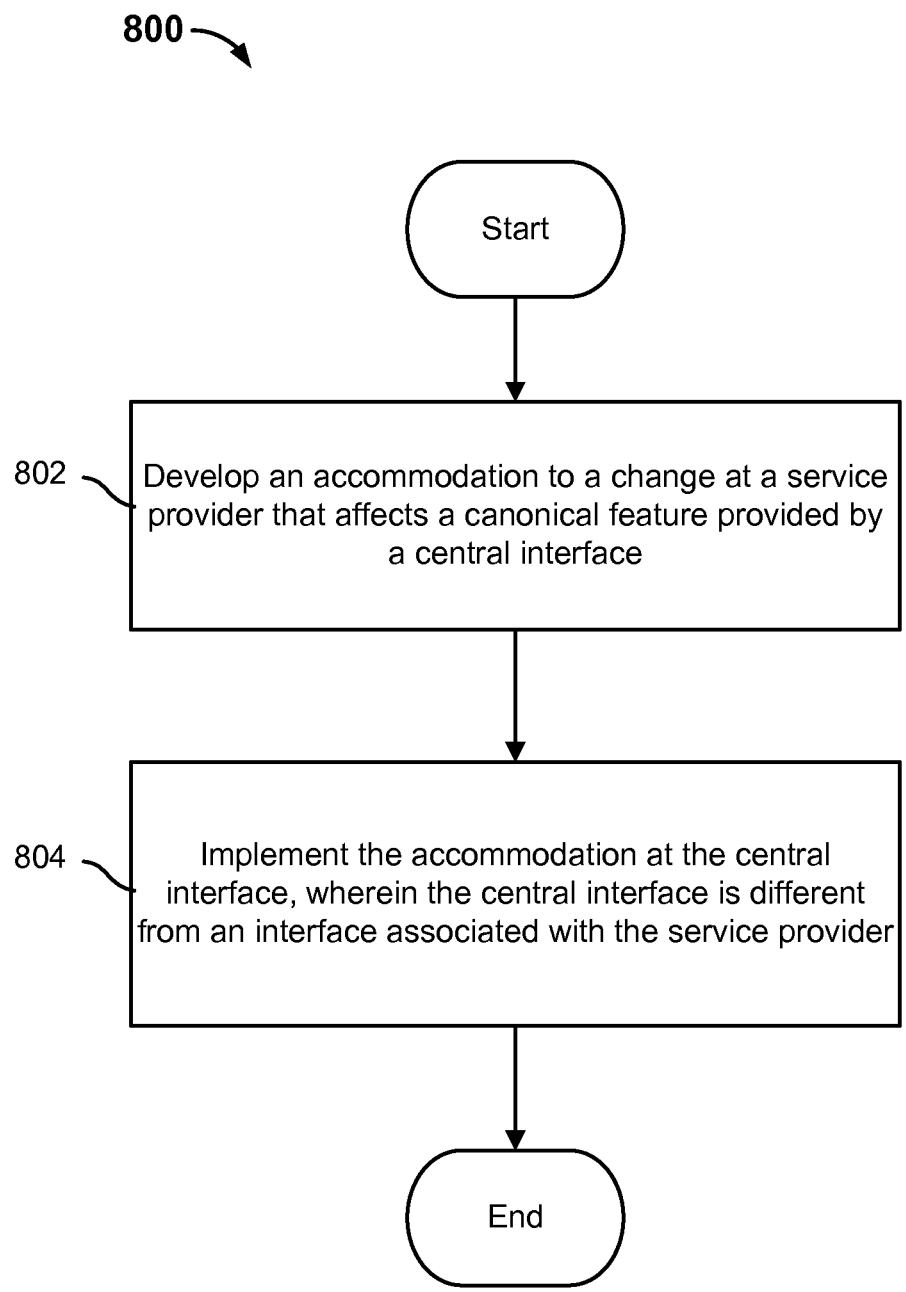
FIG. 8 is a flow diagram showing an embodiment of a process of updating and sharing integration metadata at a multi-tenant system.

FIG. 8 is a flow diagram showing an embodiment of a process of updating and sharing integration metadata at a multi-tenant system. In some embodiments, process 800 can be implemented using system 100 of FIG. 1. In some embodiments, process 800 is performed by mediation engine 306 and metadata update engine 308 of FIG. 3.

At 802, an accommodation to a change with respect to a service provider that affects a canonical feature provided via a central interface is developed. Examples of a change with respect to a service provider that affects a canonical feature include new or updated service provider client and/or server side software that affect how the canonical feature is provided, for example a new authentication protocol or new or renamed authentication related variables. Examples of an accommodation to such a change include new and/or updated metadata as described herein. For example, a member (e.g., 402) of the development community of FIG. 4 submits a new set of metadata to service management server 114 (e.g., in response to receiving a notification that the current metadata needs to be updated). The new set of metadata enables the services management server 114 to interact with the service provider in a way that causes a desired action to be performed by the service provider, in a way that accommodates the change with respect to the service provider. The community member may be a customer (e.g., tenant) supported by services management server 114.

At 804, the accommodation is implemented at the central interface. The central interface in various embodiments is different from a direct interface associated with the service provider. For example, the central interface may be associated with a service management server such as server 114 of FIG. 1, whereas the service provider interface may be an interface implemented at a service provider's server.

Returning to the previous example, subsequent to receiving the metadata submitted by the community member, services management server 114 propagates the new set of metadata to one or more customers (e.g., tenants) affected by the change with respect to the service provider (e.g., the customers that have subscriptions to that service provider). In some embodiments, services management server 114 informs affected customers of the availability of the new set of metadata. The services management server 114 accesses the new set of metadata to perform a subsequent action requested by a customer of the system that has implemented the new metadata, for example by providing an indication that the customer has migrated to a service provider software version with which the new metadata is associated. Without a central interface provided by services management server 114, each subscriber to a service provider might need to individually update its manner with which to interact with the service provider, such as a locally installed identity management solution or other connector, instead of receiving the benefit of a central point of updating and sharing metadata.

Figure 9:
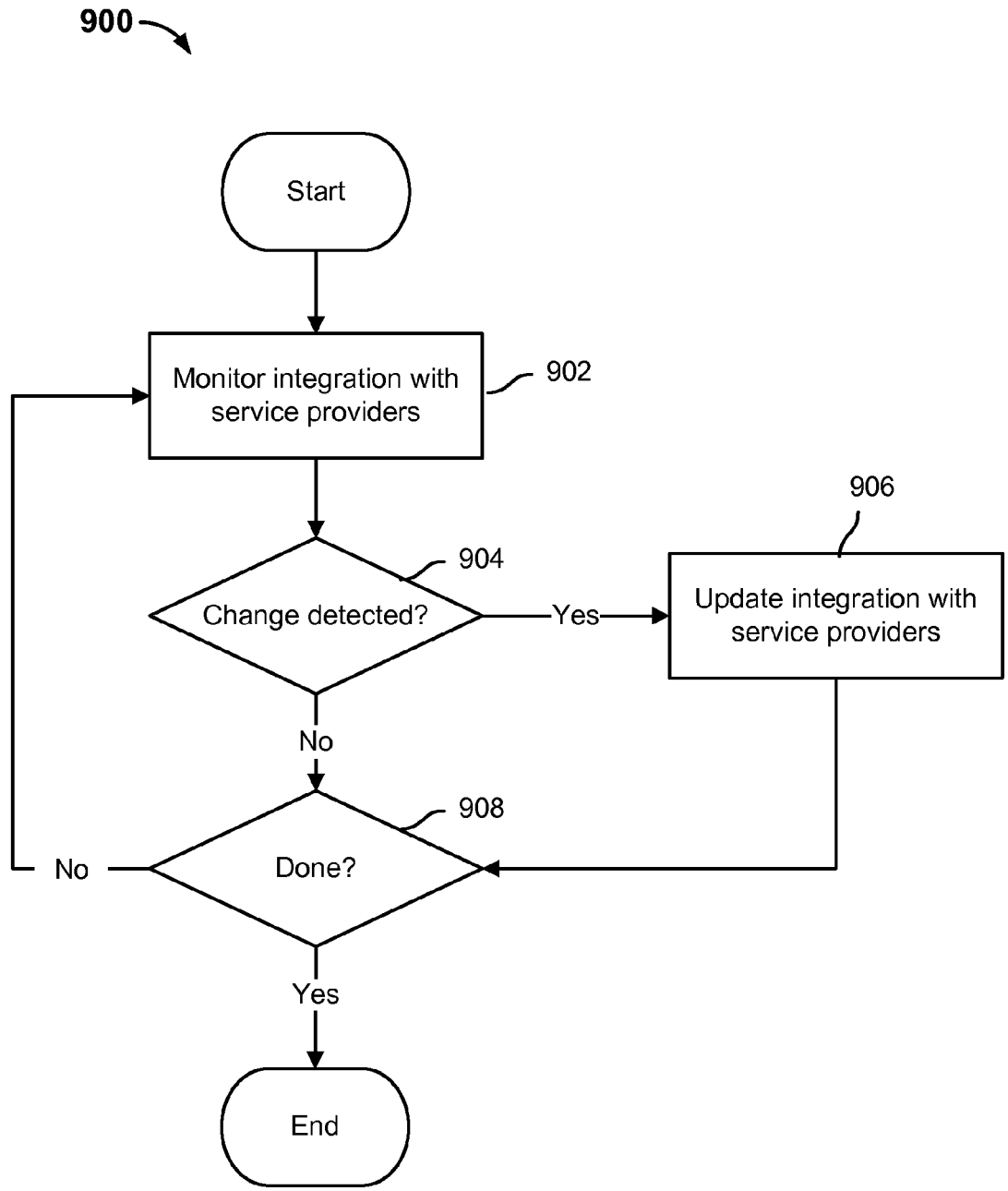
FIG. 9 is a flow diagram showing an embodiment of detecting a change at a service provider.

FIG. 9 is a flow diagram showing an embodiment of detecting a change at a service provider. In some embodiments, process 900 can be implemented using system 100.

At 902, integration with service providers is monitored. In some embodiments, a services management server queries one or more customers for any problems generated as a result of a requesting an action to be performed at a service provider associated with a canonical feature supported by the services management server. For example, the services management server can query one or more of its customers to receive any reports of abnormal behavior or errors generated as a result of accessing canonical features, e.g., at a web interface associated with services management server. In some embodiments, the services management server regularly (e.g., once a day, several times a day, once a week) tests an integration with a service provider. For example, the services management server can simulate usage with the service provider through a test account with the service provider (as opposed to accessing services at the service provider in response to a request by a customer). As used herein, a test account refers to an account through which the services of a service provider can be accessed so that the services management server can perform interactions with the service provider using the existing and/or newly developed metadata, for example to verify periodically (such as nightly) that full and proper integration using the metadata is being provided. One or more processors at the services management server can run scripts that use the existing metadata to interact with the service provider to attempt to cause the service provider to perform one or more actions associated with a canonical feature provided by the services management server.

In some embodiments, a services management server gains access to a test account with a service provider through receiving an indication (e.g., at a processor of the services management server) by a server associated with a service provider indicating the creation of an account specifically for the services management server (rather than a customer thereof). For example, a service provider can encourage integration with it through a central interface such as a services management server by donating an account (e.g., associated with a free subscription) to the service management server. In some embodiments, because the process of obtaining any account with (e.g., permission to gain access to services at) a service provider is time consuming (e.g., the process could involve negotiating a contract for service with one or more potential restrictions on use and/or paying the service provided), a services management server can obtain a test account through a customer. For example, a services management server can provide to customers an incentive to donate a test account (e.g., an otherwise unused account included in a subscription of the customer with the service provider). The services management server can do so by presenting a user interface to the customer indicating that if the customer agrees to donate an account for testing purposes, the services management server will reward the customer in some way, for example by providing recognition in the broader multi-tenant and/or developer community (e.g., on a banner on a website associated with the services management server) or a discount for future or current use of services provided by the services management server.

At 904, it is determined whether a change at the service provider is detected. In various embodiments, the detected change affects a canonical feature that is provided by a service management server. In some embodiments, a change at the service provider is determined to have been detected when in monitoring integration of the service provider at 902, the use of the existing metadata to interact with the service provider does not produce the intended results. Examples of when intended results are not produced may include, subsequent to requesting an action to be performed at the service provider, errors are generated (e.g., an exception is thrown, an error message is displayed) and/or the requested action is not performed and/or an indication of a successful performance of the action at the service provider is not returned.

For example, during 902, assume that the requested canonical feature at the services management server was a central point of user account creation at the service provider, Salesforce.com. Assume that as prescribed by the existing metadata, a successful creation of a user account at Salesforce.com should result in a return of a certain value (e.g., sent by a process associated with Salesforce.com's proprietary API). If subsequent to the services management server accessing existing metadata to perform the prescribed interactions with Salesforce.com to create a user account, an unknown value is returned (which is neither the known values that either indicate success or failure), then it is determined that a change has probably occurred at the service provider.

In some embodiments, changes may occur at the service providers that do not create an incompatibility with the existing metadata. Put another way, some changes at the service providers do not affect a canonical feature that is provided by the services management server. For example, subsequent to certain changes at a service provider, the services management server accesses the existing metadata and is able to cause the service provider to perform actions associated with a canonical feature that results in a successful performance despite changes having actually occurred at the service provider. Such changes are not detected in 904, but nor are they of interest for detection since they do not warrant an update to the existing metadata.

If a change is determined to be detected at 904, then control passes to 906. Otherwise, it is determined whether to end the process at 908. In some embodiments, process 900 resumes at 902 unless the system is shut down.

At 906, the integration with the service providers is updated. In some embodiments, in response to a detected change at a service provider, the existing metadata is updated or new metadata is created. In some embodiments, a development of community is informed to assist in updating the metadata.

Figure 10:
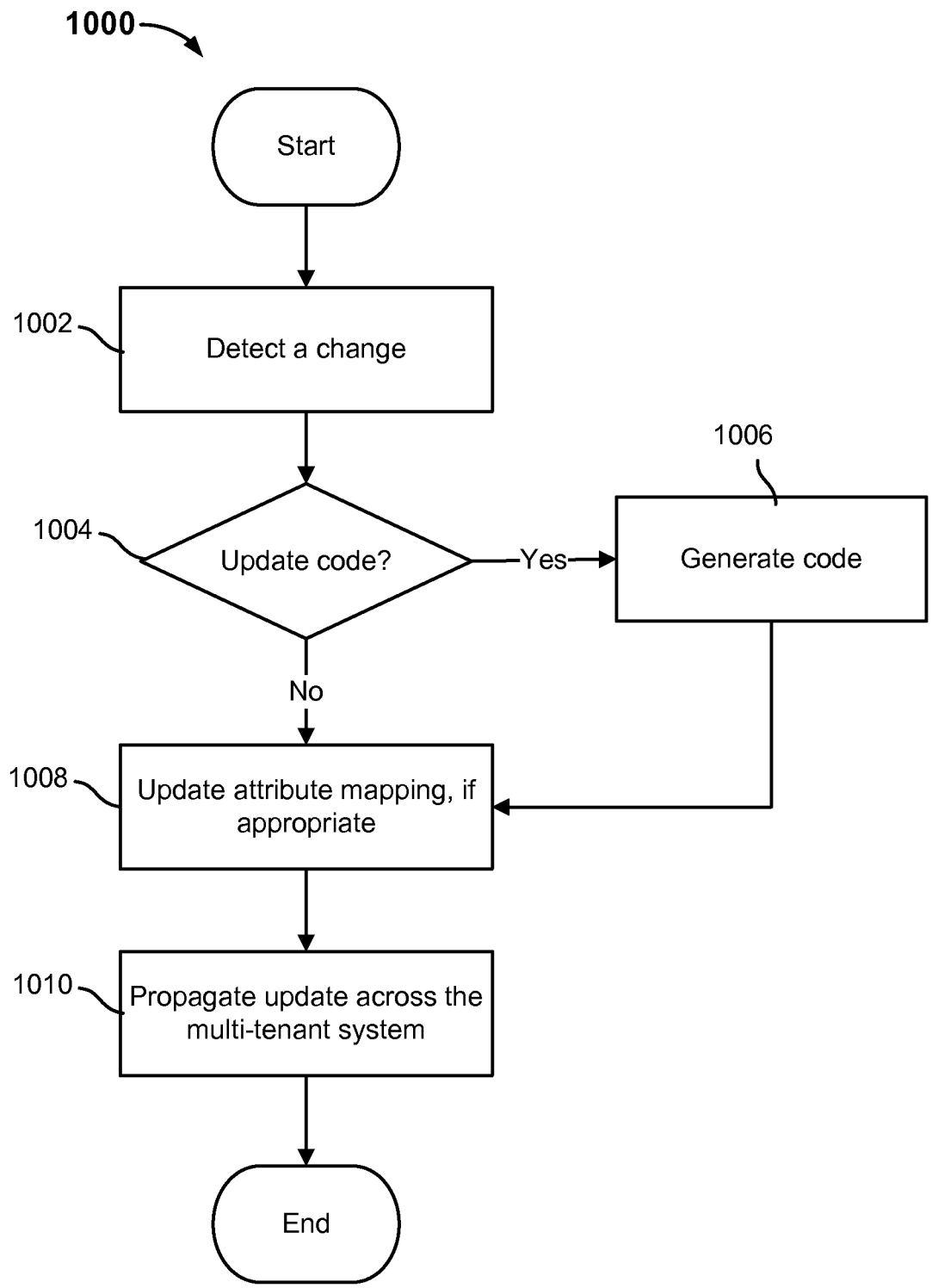
FIG. 10 is flow diagram showing an embodiment of a process for detecting a change and updating metadata in a multi-tenant system.

FIG. 10 is flow diagram showing an embodiment of a process for detecting a change and updating metadata in a multi-tenant system. In some embodiments, 906 of process 900 can be implemented with at least a portion of process 1000.

At 1002, a change at the service provider is detected. In various embodiments, the detected change affects a canonical feature that is provided by a services management server. In various embodiments, because the detected change affects a canonical feature, the existing metadata that prescribes how this canonical feature is to be interacted with requires an update. In some embodiments, the change is detected through monitoring the integration of the services management server with the service providers. For example, a change can be detected using a technique described in 902, e.g., via querying the customers and/or simulating usage using test accounts with the service providers. In some embodiments, a change is detected if by using the existing metadata to interact to a service provider, the desired result is not produced (e.g., errors are generated, the requested action is not performed at the service provider, an indication of a successful performance of the action at the service provider is not returned).

A change detected at 1002 that warrants an update to the existing metadata can be due to various reasons. In one example, an element (e.g., a uniform resource locator, link, selectable option, data field) on a website associated the service provider is modified (e.g., its location has been moved to a different area of the website) or removed altogether. As a result, the instructions prescribed by the existing metadata can no longer locate this element. In a second example, the uniform resource locator (URL) of a webpage (e.g., used for logging in to use services) associated with a service provider is changed (e.g., to a different URL address) such that the existing metadata can no longer locate the current website for performing login for a customer. In a third example, the return value that indicates a successful performance of an action (e.g., associated with a canonical feature provided by the services management server) has changed to another value such that it is unrecognizable as an indication of a successful performance according to the instructions or data attribute mappings of the existing metadata. In a fourth example, a new required data attribute field is added at an interface associated with the service provider for which the existing metadata does not include a mapping to (e.g., the mapping prescribed by the existing metadata does not map a value to the new field). In a fifth example, a new API is created for (e.g., an application associated with) a service provider. The new API could differ enough from the previous API such that the instructions prescribed by the existing metadata is unable to invoke the same calls, functions and/or processes at the new API as it could for the previous API. In some embodiments, any or all of the above examples of changes at the service provider could be included in a new version of an application associated with the service provider. In some embodiments, any or all of the above examples of changes at the service provider can be addressed by updating either or both of the code or the attributes mappings associated with the metadata.

At 1004, it is determined whether code associated with the metadata needs to be updated. In some embodiments, code includes any functions, methods, processes, executable instructions, instructions for what settings or values to provide or populate a function or process with, or other functionality for communicating with or interacting with a service provider to perform one or more tasks in order to accomplish a desired canonical service. In some embodiments, a change that occurs at a service provider requires that information (e.g., values of data attribute fields) be passed in a manner different than was required before the change. In some embodiments, a change at the service provider requires that new instructions be given on how to interact with a new protocol (e.g., associated with a new API and/or introduction of a third party service to be used with performing an action at the service provider).

For example, for a canonical feature of a central point creation of a user account, the services management server uses metadata that collects information from an end user (e.g., at a user interface associated with the services management server) that maps to various required data attribute fields at an interface associated with a service provider. In this example, to create a user account at the service provider Salesforce.com, data values were required for the fields of name, address, company, and birthday. Also, in this example, a change at Salesforce.com occurs such that to create a user account with the service provider, an additional data field of gender is now required. However, the existing metadata associated with the Salesforce.com service provider did not prescribe instructions to pass the value of a gender data type (e.g., a string, say, gender id) to this newly created data field reserved for gender. As a consequence, code needs to be generated at 1006 and added to the existing set of metadata for the Salesforce.com service provider to ensure that the data value of gender id is appropriately passed to the new gender data field required by the service provider.

Using context of the previous example, now assume that a change at Salesforce.com occurs such that an authentication process is added to the procedure of creating a user account with the service provider. In this example, the authentication process includes having a third party (e.g., an authentication service) to verify the identity of the user attempting to create an account. Also, assume that the existing metadata associated with the Salesforce.com service provider did not prescribe instructions on how to interact with the third party authentication service such as, e.g., how to pass certain pieces of identity and contact information to the third party service so that the service can email a security token to the user's email account. As a consequence, code needs to be generated at 1006 and added to the existing set of metadata for the Salesforce.com service provider to ensure that the necessary information is appropriately passed to the third party authentication service in the process of creating a user account at a service provider.

Otherwise, if no code needs to be updated or generated, then control passes to 1008. At 1006, code may be generated by any member of a development community. In some embodiments, new code is generated to be used with existing code of the metadata. In some embodiments, new code is generated to replace existing code of the metadata (e.g., the code can be stored as a new set of metadata that corresponds to a new version of an application).

At 1008, attribute mapping associated with the metadata is updated, if appropriate. In various embodiments, attribute mappings associated with (e.g., included in) the metadata includes attribute bindings and mappings of data fields (e.g., between those of the user interface of a services management server and those of an interface at a service provider). In some embodiments, a change that occurs at a service provider requires that information (e.g., values of data attribute fields) be mapped in a manner different than was required before the change. In some embodiments, attribute mappings are included in a XML file.

Returning to a similar premise as the previous example, assume that whereas the data field (e.g., attribute) associated with a name at an interface associated with Salesforce.com was previously "name_identifier" but has now been changed to "user_identifier." The existing metadata had prescribed for a data value associated with a name data type (e.g., received at a user interface associated with the services management server) to be mapped to (e.g., or bound to) the data field "name_identifier," which now no longer exists. As a consequence, the attribute mapping needs to be updated to bind the data value of a name data type at the services management server to the data field of "user_identifier" (instead of "name_identifier"). In various embodiments, attribute mappings or updates to existing attribute mappings may be created by any member of a development community. In some embodiments, updated attribute mappings are created in conjunction (and to be used) with newly generated code.

At 1010, the updated metadata is propagated across the multi-tenant system. In some embodiments, once the metadata is updated, a notice of this update is sent to one or more customers of the multi-tenant system. In some embodiments, a notice is send to only the customers (e.g., tenants) of the system who are affected by the detected change at the service provider and would therefore benefit from using the updated metadata. In some embodiments, the notified customers could elect to use the updated metadata (e.g., by indicating on a user interface associated with the services management server). In some embodiments, with or without notifying the customers of the update to the metadata, services management server will automatically default to accessing the updated metadata the next time a request is made by any customer for a canonical feature for which the associated metadata was updated.

Figure 11:
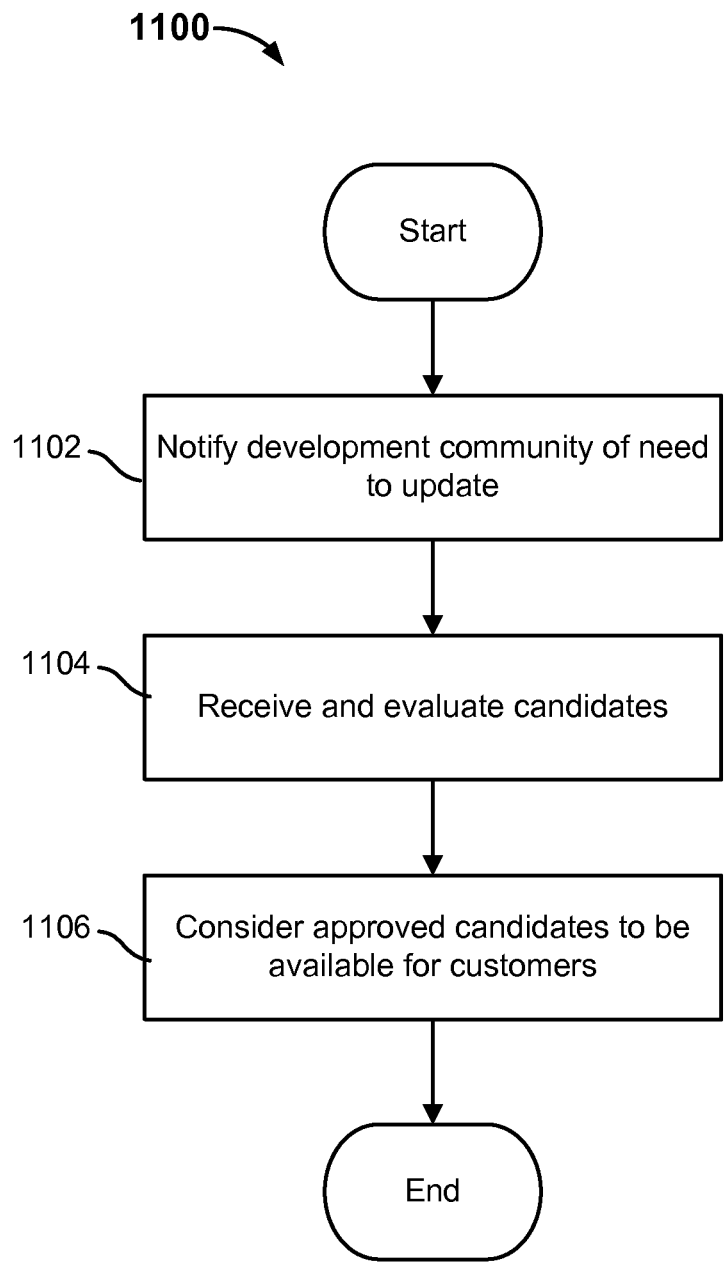
FIG. 11 is a flow diagram showing an embodiment of a process for interacting with a development community for updating metadata.

FIG. 11 is a flow diagram showing an embodiment of a process for interacting with a development community for updating metadata. In some embodiments, 906 of process 900 can be implemented at least in part with process 1100. In some embodiments, the development community can be similar to the development community described in FIG. 4.

One purpose of process 1100 is to utilize the collective knowledge of a community to solve a problem that is likely common to at least a subset of the community. As described for FIG. 4, the members of the development community could include the tenants in the multi-tenant system. For example, by soliciting the help from anyone in the community, the entire community can benefit from the solutions offered up by an individual member. Also, in some instances, if multiple solutions (e.g., updates to the metadata) are submitted, then the community can also benefit from a diversity of options for solving the same problem.

At 1102, a development community is notified of a need to update the metadata. In some embodiments, subsequent to detecting a change at a service provider that requires an update to the metadata, a notice is sent out to one or more members of the development community. In some embodiments, a notice can take the form of a message (e.g., via email or a display on a user interface presented by the services management server). For example, the message can indicate at which service provider and/or which canonical features a change has been detected. Also, the message can indicate that the change has introduced an incompatibility with the existing metadata such that metadata requires an update. In some embodiments, a notification can indicate that a detected change at the service provider is associated with a version upgrade at the service provider.

In some embodiments, the notice is sent to only a subset of the entire development community. For example, only the members of the community who are also administrators of the services management server or who are customers of the services management server are notified. One reason for this selective notification is because certain community members could be presumed (in some situations) to have better knowledge of what caused the detected problem and what could be done to fix them (e.g., how to update the existing metadata).

At 1104, candidate sets of updates to the metadata are received and evaluated. In some embodiments, sets of updates to the metadata (e.g., contained in files) are sent by members of the development community. In some embodiments, the submitted sets of metadata are considered to be candidates until they have been evaluated (e.g., by administrators of the services management server). In some embodiments, the candidate sets of updates to the metadata are tested by the administrators to check for any errors and smooth integration with the service provider such as with a new version of an application associated with the service provider.

At 1106, the approved candidates are considered to be available for customers. In some embodiments, subsequent to evaluating the candidate sets of updates to the metadata, the approved sets are considered to be available for use by the customers of the services management server. In some embodiments, approved sets of updated metadata have been proven to provide smooth integration of the service provider over repeated trials.

Figure 12:
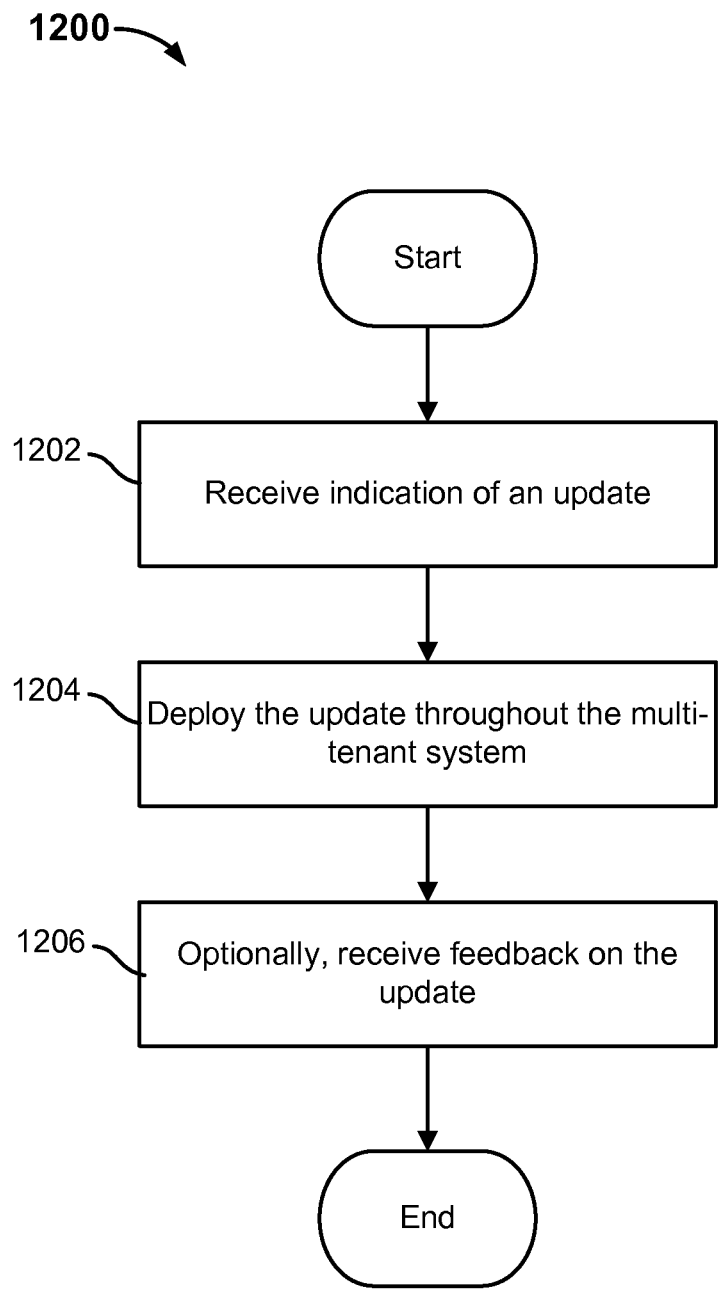
FIG. 12 is a flow diagram showing an embodiment of a process of propagating updated metadata across a multi-tenant system.

FIG. 12 is a flow diagram showing an embodiment of a process of propagating updated metadata across a multi-tenant system. In some embodiments, 1010 of process 1000 can be implemented with process 1200.

An advantage of process 1200 is its ability to permit all the affected members of the multi-tenant system to quickly adopt the most up-to-date integration metadata whenever an update or change occurs at a service provider. In other systems that do not include an interface such as services management server that centrally implements accommodations to tenants of a multi-tenant system, a "version skew" problem would arise where each installation of an integration to service providers would need to be updated each time any service provider changed.

At 1202, an indication of an update is received. In some embodiments, once a candidate set of updates to the metadata has been approved by the administrators of the services management server, an indication is sent to the server.

At 1204, the update is deployed throughout the multi-tenant system. In some embodiments, the update to the metadata is deployed in the sense the customers (e.g., tenants) of the services management server are notified of the availability of a new set of metadata and/or can choose from the available selection. For example, the services management server can present a user interface displaying all available sets of metadata to be used to integrate with various service providers for performing various actions associated with canonical features provided by the services management server. Each set of metadata can be displayed with descriptive information. For instance, a set of metadata that is created in response to a new version (e.g., version 2.0) of an application associated with a service provider (e.g., Salesforce.com) can be labeled as such ("Metadata for version 2.0 of Salesforce.com"). A customer that has recently adopted the version 2.0 of Salesforce.com might want to also quickly adopt the metadata (e.g., by selection via the user interface) created especially for the new version in order to prevent any future problems in accessing canonical features at the service management server to cause an action to be performed at Salesforce.com. In this example, the customer can select this updated set of metadata for all interactions with Salesforce.com via the services management server going forward. However, a customer who subscribes to Salesforce.com version 1.0 may not feel the need to adopt the metadata for version 2.0. As such, in some embodiments, multiple sets of metadata that correspond to different versions of a service provider application can exist. Also, multiple sets of metadata (e.g., created by different developers) that correspond to the same version of a service provider application can also exist. Other examples of descriptive information that a set of metadata may be displayed with include for how long the metadata has been available, by whom (e.g., which member of the development community) it was created, associated ratings or reviews, and the number of customers that have adopted the metadata so far. One purpose to include such descriptive information for each set of metadata is to allow the viewing customer to select the set of the metadata that best fit its criteria. For instance, one customer might prefer to wait until a set of metadata has been used and approved by several customers before adopting it itself. Meanwhile, another customer might prefer to adopt a set of new metadata as soon as it is available.

In some embodiments, the update to the metadata is deployed in the sense that in providing canonical features subsequent to the deployment of a set of metadata, that updated set of metadata is accessed by default (without the selection by the customers). For example, the services management server can detect (e.g., via query) which of its customers is using which version of a service provider application. In this example, if Salesforce.com has created a new version (e.g., version 2.0) of its application and a set of metadata has been created to accommodate this new version, then the services management server can automatically access the updated set of metadata for use with the customers who are using version 2.0 of the Salesforce.com application. This way, using the awareness of which customers are subscribed to which versions of a service provider application (e.g., by using stored customer profiles), the services management server can automatically migrate customers to updated metadata without any delay.

At 1206, feedback on the update to the metadata is optionally received. In some embodiments, customers can respond to the updated metadata by submitting ratings and/or reviews for each set of updated metadata. In some embodiments, the feedback is stored and presented at a user interface for selecting available sets of metadata so that viewers can be informed on the reception of different sets of metadata.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method performed by a services management platform (SMP), wherein the SMP is configured to provide a canonical feature with respect to a first service provider and with respect to additional service providers to users, the method comprising:

receiving, from a user device, a request for the first service provider to invoke the canonical feature;

identifying metadata associated with the first service provider;

accessing, within the identified metadata, a metadata portion associated with the canonical feature, wherein the metadata portion enables the SMP to communicate with the first service provider to cause the first service provider to invoke the canonical feature;

determining that software code associated with the first service provider has changed such that the SMP is no longer able to communicate with the first service provider to cause the first service provider to invoke the canonical feature; and modifying the metadata portion such that the SMP is once again able to communicate with the first service provider to cause the first service provider to invoke the canonical feature.

2. The method of claim 1, wherein determining that software code associated with the first service provider has changed comprises detecting the change at least in part by testing access to the canonical feature.

3. The method of claim 1, further comprising using a test account to test access to the canonical feature.

4. The method of claim 1, further comprising providing to one or more users an incentive to make available a test account for use in testing access to the canonical feature.

5. The method of claim 1, wherein the change comprises a software version change.

6. The method of claim 1, wherein the change comprises a modification to an Application Programming Interface associated with the first service provider.

7. The method of claim 1, further comprising propagating the modification to one or more affected users of the SMP.

8. The method of claim 1, further comprising notifying one or more affected users of the SMP that the modification is available.

9. The method of claim 1, further comprising updating a profile data associated with a user to associate the modification with the user.

10. The method of claim 1, further comprising notifying a member of a developer community of one or both of the change and a need for the modification.

11. The method of claim 1, further comprising receiving feedback on the modification from one or more users.

12. The method of claim 1, further comprising delaying implementation of the change with respect to one or more users until the modification has been received and made available for use.

13. The method of claim 1, further comprising implementing the modification, with respect to each of a plurality of affected users, in a manner determined at least in part by a preconfigured policy of that user.

14. The method of claim 1, wherein the canonical feature comprises a central point of user account management for the first service provider and for the additional service providers.

15. The method of claim 14, wherein user account management comprises user account creation or user account deactivation.

16. The method of claim 1, wherein the canonical feature comprises single-portal access to services from the first service provider and from the additional service providers.

17. The method of claim 1, wherein the canonical feature comprises central performance management for the first service provider and for the additional service providers.

18. The method of claim 1, wherein the canonical feature comprises a dashboard showing response times for the first service provider and for the additional service providers.

19. A services management platform (SMP) configured to provide a canonical feature with respect to a first service provider and with respect to additional service providers to users, the SMP comprising:

a processor configured to:

receive, from a user device, a request for the first service provider to invoke the canonical feature;

identify metadata associated with the first service provider;

access, within the identified metadata, a metadata portion associated with the canonical feature, wherein the metadata portion enables the SMP to communicate with the first service provider to cause the first service provider to invoke the canonical feature;

determine that software code associated with the first service provider has changed such that the SMP is no longer able to communicate with the first service provider to cause the first service provider to invoke the canonical feature; and modify the metadata portion such that the SMP is once again able to communicate with the first service provider to cause the first service provider to invoke the canonical feature; and a memory coupled to the processor and configured to provide the processor with instructions.

20. A computer program product for a services management platform (SMP) to provide a canonical feature with respect to a first service provider and with respect to additional service providers to users, the computer program product being embodied in a non-transitory computer readable storage medium and comprising computer instructions for:

receiving, from a user device, a request for the first service provider to invoke the canonical feature;

identifying metadata associated with the first service provider;

accessing, within the identified metadata, a metadata portion associated with the canonical feature, wherein the metadata portion enables the SMP to communicate with the first service provider to cause the first service provider to invoke the canonical feature;

determining that software code associated with the first service provider has changed such that the SMP is no longer able to communicate with the first service provider to cause the first service provider to invoke the canonical feature; and modifying the metadata portion such that the SMP is once again able to communicate with the first service provider to cause the first service provider to invoke the canonical feature.

* * * * *